(12) United States Patent
Miller et al.

(10) Patent No.: US 11,179,909 B2
(45) Date of Patent: **\*Nov. 23, 2021**

(54) METHOD FOR REMOVING LIQUID FROM A SLURRY

(71) Applicants: VOITH PATENT GMBH, Heidenheim (DE); IOGEN ENERGY CORPORATION, Ottawa (CA)

(72) Inventors: William Miller, Orleans (CA); Trevor Richardson, Cardinal (CA); Stephen A. Rowland, Brownsburg-Chatham (CA)

(73) Assignees: Voith Patent GmbH, Heidenheim (DE); Iogen Energy Corporation, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/829,399

(22) Filed: Mar. 25, 2020

(65) Prior Publication Data

US 2020/0223169 A1    Jul. 16, 2020

Related U.S. Application Data

(63) Continuation of application No. 14/408,068, filed as application No. PCT/EP2013/061944 on Jun. 11, 2013, now Pat. No. 10,654,235.

(Continued)

(51) Int. Cl.
*B30B 9/12*        (2006.01)
*C02F 11/125*   (2019.01)
(Continued)

(52) U.S. Cl.
CPC .............. *B30B 9/125* (2013.01); *B30B 9/12* (2013.01); *B30B 9/127* (2013.01); *B30B 9/14* (2013.01); *B30B 9/18* (2013.01); *C02F 11/125* (2013.01)

(58) Field of Classification Search
CPC    B30B 9/125; B30B 9/12; B30B 9/127; B30B 9/14; B30B 9/18; B30B 9/202; C02F 11/125
See application file for complete search history.

(56) References Cited

U.S. PATENT DOCUMENTS 2,322,791 A * 6/1943  De Back .............. B30B 9/12
                                                            100/147
2,664,814 A * 1/1954  Ahlborn .............. B30B 9/128
                                                            100/117

(Continued)

*Primary Examiner* — Adam J Eiseman
*Assistant Examiner* — Mohammed S. Alawadi
(74) *Attorney, Agent, or Firm* — Laurence A. Greenberg; Werner H. Stemer; Ralph E. Locher

(57) ABSTRACT

A method for removing liquid from a slurry includes: (i) feeding the slurry into the inlet of a press; (ii) removing liquid from the slurry as the slurry advances through a deliquifying section of the press, thereby producing a pressate stream; (iii) forming a plug of material as the slurry is advanced through a plug formation section of the press; (iv) advancing the plug of material to a discharge section of the press; and (v) removing additional liquid from the plug of material by operating the press so that the pressure in the discharge section of the press is greater than the pressure of the pressate stream by at least 2 psi. The present invention also relates to a method for controlling discharge consistency from a press, without provision of discharge restrictors, by varying the pressure differential between a discharge section of the press and a pressate stream.

18 Claims, 1 Drawing Sheet

Related U.S. Application Data

(60) Provisional application No. 61/658,968, filed on Jun. 13, 2012.

(51) Int. Cl.
  *B30B 9/14* (2006.01)
  *B30B 9/18* (2006.01)

(56) References Cited

U.S. PATENT DOCUMENTS

| | | | |
|---|---|---|---|
| 2,903,960 A | | 9/1959 | Zies |
| 2,930,314 A | * | 3/1960 | Carlson .................. B30B 9/12 100/147 |
| 3,111,080 A | * | 11/1963 | French .................... B30B 9/12 100/37 |
| 3,135,193 A | | 6/1964 | Hunt |
| 3,230,865 A | | 1/1966 | Dietmar ................ B01D 29/25 100/37 |
| 3,232,722 A | * | 2/1966 | Sanders .................. C10L 5/44 44/636 |
| 3,235,087 A | | 2/1966 | Andrews et al. |
| 3,256,808 A | * | 6/1966 | Hunt ........................ B30B 9/12 100/117 |
| 3,411,435 A | | 11/1968 | French et al. |
| 3,943,034 A | * | 3/1976 | Wallen .............. B01D 29/6476 162/232 |
| 3,982,483 A | | 9/1976 | Bird et al. |
| 4,117,776 A | | 10/1978 | Hunt |
| 4,212,239 A | * | 7/1980 | Fraula ................... B30B 9/128 100/117 |
| 4,273,035 A | * | 6/1981 | Cusi ......................... B30B 9/02 100/117 |
| 4,291,619 A | | 9/1981 | Hunt et al. |
| 4,340,184 A | | 7/1982 | Poss ....................... A22C 17/04 241/82.3 |
| 4,440,076 A | * | 4/1984 | Mansfield ............... B30B 9/121 100/117 |
| 4,466,809 A | * | 8/1984 | Kissel .................... B65G 33/18 48/197 R |
| 5,009,795 A | | 4/1991 | Eichler |
| 5,338,366 A | | 8/1994 | Grace et al. |
| 5,613,434 A | | 3/1997 | Hartmann |
| 5,665,232 A | | 9/1997 | Schlegel ................ B30B 9/12 100/117 |
| 5,713,268 A | | 2/1998 | Krieger .................... B30B 9/12 100/117 |
| 5,833,851 A | * | 11/1998 | Adams ................. B01D 29/118 210/413 |
| 6,451,213 B2 | * | 9/2002 | Huebner ................ B01D 29/23 210/770 |
| 6,767,432 B1 | | 7/2004 | Laine ....................... D21C 9/18 162/243 |
| 7,383,842 B1 | * | 6/2008 | Sabol ....................... B30B 9/12 134/65 |
| 7,540,938 B2 | | 6/2009 | Munster |
| 7,721,895 B2 | * | 5/2010 | Mueller .................... D21D 5/04 209/306 |
| 7,758,721 B2 | | 7/2010 | Sabourin .................. D21B 1/02 162/16 |
| 8,505,447 B2 | * | 8/2013 | Burke ...................... B30B 9/18 100/35 |
| 10,646,063 B2 | * | 5/2020 | Sedlmaier ................ B30B 9/14 |
| 2001/0039887 A1 | * | 11/2001 | Reddoch ................. B30B 9/18 100/117 |
| 2009/0065448 A1 | | 3/2009 | Schedler |
| 2010/0056774 A1 | | 3/2010 | Anand ..................... C08H 8/00 536/124 |
| 2011/0110810 A1 | | 5/2011 | Burke |
| 2011/0297016 A1 | * | 12/2011 | Yamashita ............... B30B 9/18 100/145 |
| 2013/0264264 A1 | * | 10/2013 | Lehoux .................... B30B 9/12 210/231 |

\* cited by examiner

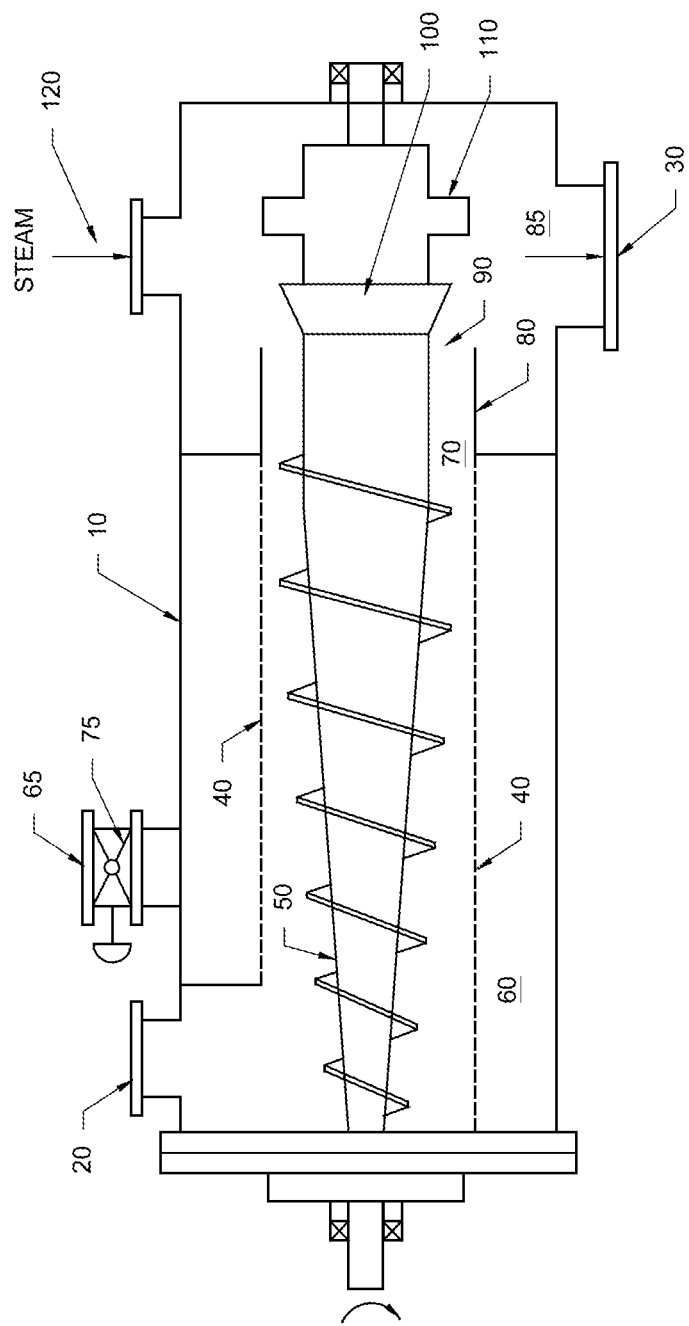

METHOD FOR REMOVING LIQUID FROM A SLURRY

CROSS-REFERENCE TO RELATED APPLICATION

This application is a continuation of patent application Ser. No. 14/408,068, filed Dec. 15, 2014; which was a § 371 national stage filing of international application No. PCT/EP2013/061944, filed Jun. 11, 2013, which designated the United States; this application also claims the benefit, under 35 U.S.C. § 119(e), of provisional patent application No. 61/658,968, filed Jun. 13, 2012; the prior applications are herewith incorporated by reference in their entirety.

BACKGROUND OF THE INVENTION

Field of the Invention

The present invention relates to an improved method for removing liquid from a slurry. In particular, the present invention relates to an improved process for removing liquid from a slurry using a press.

Slurries are processed in many industries ranging from food processing to biofuel production. In the production of biofuels, for example, the addition of water or other liquid to the incoming feedstock to form a slurry facilitates the transportation and mechanical handling of the feedstock.

There has been impetus in many industries in recent years to reduce the liquid content of slurries to improve process economics. Processing of slurries with low liquid content can considerably reduce energy and chemical usage in a plant. For example, in ethanol production, feedstock slurries can be deliquified prior to energy intensive operations such as heating of the feedstock slurry, which is employed in a cooking operation conducted with acid or alkali, known as pretreatment. The low liquid content in the incoming slurry requires less steam to heat during pretreatment, thus reducing energy costs. Moreover, lower volumes of liquid in the slurry result in reductions in equipment size, which reduces capital and operating costs.

Various devices are known for mechanically removing liquid from a slurry to increase its solids content. One such device is a press that operates by pressing liquid out of the slurry by the mechanical action of a conveyance member, which is a device that advances material through the press. An example is a screw press that removes liquid by an axially mounted rotating screw. The screw rotates within a shell containing passages through which liquid can pass, but that retains most of the solids. After initial liquid removal, the resultant partially deliquified slurry is further compacted by advancing it through a plug formation section of the screw press. This compacting action forms an integrated mass of material, known as a "plug". The plug formation section may be a tube attached to the discharge end of the deliquifying section. Plug formation in a screw press increases the internal pressure of the slurry leading to increased removal of liquid and may also form an internal pressure seal.

It is important in many industrial applications that the material discharged from the press has a consistency that does not vary considerably from a target range. If material discharged from a press is too thick, wear on the press increases quickly as well as the load on the motor. Increases in discharge consistency may also lead to plugging of the press or downstream equipment. Conversely, material that is too thin may increase chemical and steam usage. Although the material discharged from the press can be evaporated or dilution liquid can be added to the discharged material to reach a desired consistency, these additional operations add cost to the process.

One means for controlling discharge consistency from the press is through the use of flow restriction devices, also known in the art as "restrictors", placed at the discharge end of the press. Flow restriction devices partially obstruct the flow of the plug from the discharge end of the press. By obstructing the flow, counter pressure is built up against the plug, and the degree of compaction of the slurry is increased, which in turn leads to increased liquid removal from the slurry in the deliquifying section of the press.

Fine control of discharge consistency from a press can be achieved by specially designed mechanical restriction devices. Such devices are known in the art as "variable discharge restrictors". Examples of discharge restrictors include those that function by biasing a door against the plug at the discharge section of the press. When the back pressure of the door is overcome by the force of the plug, the door slides rearwardly, allowing for ejection of plug material. The back pressure on the door can be controlled by hydraulic pressure or by springs, which in turn determines the discharge consistency of the plug. Other mechanical devices that are used to adjust the degree to which the discharge flow of material from the press is impeded include spring-loaded flippers, which rotate with the conveyance member and restrict the discharge (see U.S. Pat. Nos. 3,256,808 and 3,135,193). Variations of these concepts have been implemented on presses over the years.

Although these mechanical designs can control the discharge consistency from the press within a set range, they add mechanical complexity. This increases capital costs and requires increased maintenance. Thus, there is a need in the art for a more simple and cost effective means for controlling the discharge consistency of a press. Such a process would desirably improve process reliability, without the disadvantages of increased mechanical complexity.

SUMMARY OF THE INVENTION

The present invention overcomes, ameliorates or provides useful alternatives in relation to known processes for removing liquid from a slurry.

According to one aspect of the invention, there is provided a method for removing liquid from a slurry using a press comprising an inlet, a deliquifying section, a plug section, a plug discharge section, an outlet and a conveyance member mounted axially in the press for advancing material therethrough. According to the invention, the press is operated so that the pressure within the discharge section of the press is greater than the pressure of a pressate stream produced in the deliquifying section of the press. This produces a plug of material having reduced liquid content. By operating the press so that there is a pressure differential between the pressate stream and the discharge section, the discharge consistency can be controlled without requiring complex mechanical devices for this purpose, such as variable discharge restrictors.

According to one aspect of the invention, the method comprises the steps of: (i) feeding the slurry into the inlet of the press and advancing the slurry through the deliquifying section of the press; (ii) removing liquid from the slurry as the slurry advances through the deliquifying section, thereby producing a pressate stream comprising liquid pressed from the slurry; (iii) forming a plug of material as the slurry is advanced through the plug formation section of the press;

(iv) advancing the plug of material to the discharge section of the press; (v) removing additional liquid from the plug of material by operating the press so that the pressure in the discharge section of the press is greater than the pressure of the pressate stream by at least 2 psi, thereby producing a plug of material having reduced liquid content; and (vi) removing the plug of material having reduced liquid content, or segments thereof, through the outlet of the press.

Preferably, the press is operated so that the pressure in the discharge section is greater than the pressure of the pressate stream by at least 2 psi (14 kPa), more preferably by at least 5 psi (34 kPa) and most preferably by at least 10 psi (69 kPa). The pressure in the discharge section may be greater than the pressure of the pressate stream by up to 30 psi (207 kPa), more preferably up to 25 psi (172 kPa). Even greater differential pressures may be desirable in some embodiments of the invention. Thus, in further embodiments, the pressure in the discharge section may be greater than the pressure of the pressate stream by up to 35 (241 kPa), 40 (276 kPa), 45 (310 kPa) or 50 psi (345 kPa).

According to a further embodiment, the press includes one or more baskets in the deliquifying section with openings to allow liquid to pass through while retaining undissolved solids. Without being limiting, the openings may be round, slotted or hexagonal.

According to one embodiment, the press further comprises an enclosed pressate chamber with means to control the pressate chamber pressure independent of the pressure in the plug discharge section.

According to further embodiments, the press comprises anti-rotation elements in the plug section for reducing or eliminating rotation of the plug with the conveyance member. The anti-rotation elements may comprise cutting members.

In further embodiments, the plug of material may pass through a throat section in the discharge section which is defined by a restricting member mounted on the conveyance member.

According to one embodiment of the invention, the pressure in the discharge section is controlled by the addition of a compressed gas. In a further embodiment, the pressure in the discharge section is controlled by the addition of steam.

According to a further aspect of the invention, there is provided a method for controlling liquid removal from a slurry using a press comprising an inlet, a deliquifying section, a plug formation section, a discharge section, an outlet and a conveyance member mounted axially within the press, said method comprising the steps of: (i) feeding the slurry into the inlet of the press and advancing the slurry through the deliquifying section of the press; (ii) removing liquid from the slurry as the slurry advances through the deliquifying section, thereby producing a pressate stream comprising liquid pressed from the slurry; (iii) forming a plug of material as the slurry is advanced through the plug formation section of the press; (iv) advancing the plug of material to the discharge section of the press; (v) varying a pressure differential between the pressate stream and the discharge section of the press so as to achieve a target consistency of a plug or segments thereof at the outlet of said press; and (vi) removing a plug of material, or segments thereof, having the target consistency through the outlet of said press. By the aforesaid target consistency, it is meant a predetermined consistency value or range. The actual consistency achieved at the outlet of the press should generally not differ by +/−1 wt %, more preferably by +/−0.5 wt % of the predetermined target consistency.

Preferably, varying the pressure differential comprises varying the pressure of the pressate and holding the pressure of the discharge section constant. According to another embodiment of the invention, varying the pressure differential comprises varying the pressure of the discharge section and holding the pressure of the pressate stream constant.

The present invention also relates to any of the foregoing aspects and embodiments thereof, wherein the slurry fed to the inlet of the press and the discharge section of the press are pressurized. The slurry fed to the inlet of the press may be pressurized by one or more pumps.

Preferably, the conveyance member is a rotatable screw mounted axially within the press. The rotatable screw may have increasing cross-sectional area from the inlet to the outlet thereof. The cross-sectional area of the rotating screw is measured perpendicular to the longitudinal axis of the press.

According to a further aspect of the invention, there is provided a method for reducing steam or chemical use in a lignocellulosic conversion process to produce a fuel or chemical. The lignocellulosic conversion process refers to a process for converting a lignocellulosic feedstock to a fuel or other useful chemicals by subjecting the feedstock to one or more chemical and/or biological treatment stages. The method comprises deliquifying a lignocellulosic feedstock slurry prior to treatment in a reactor by feeding the lignocellulosic feedstock slurry to a press that presses liquid out of the slurry by the mechanical action of a conveyance member, thereby producing a deliquified slurry and a pressate stream, which press comprises a discharge section having a pressure that differs by at least 2 psi from the pressure of the pressate stream. Preferably, the reactor is a pretreatment reactor.

In one embodiment, the lignocellulosic conversion process produces ethanol.

Preferably, the consistency of material discharged from the press is between 20 and 35 wt % undissolved solids.

BRIEF DESCRIPTION OF THE INVENTION

The FIGURE is a schematic side view of a screw press according to the invention.

DETAILED DESCRIPTION OF THE INVENTION

The following description is of a preferred embodiment by way of example only and without limitation to the combination of features necessary for carrying the invention into effect.

Slurry Preparation

The slurry from which liquid is removed in accordance with the invention may include organic material or materials derived from inorganic sources. Preferably, the slurry comprises organic material, which may be of plant and/or animal origin. The plant derived organic material may comprise polysaccharides, including cellulose and hemicellulose and starch, oligosaccharides, disaccharides, monosaccharides, or a combination thereof.

Preferably, the slurry is a lignocellulosic feedstock slurry. By the term "lignocellulosic feedstock", it is meant any type of woody or non-woody plant biomass, or feedstock derived from plant biomass, such as, but not limited to, dedicated biomass crops such as, but not limited to, grasses, for example, but not limited to, C4 grasses, such as switch grass, cord grass, rye grass, miscanthus, reed canary grass, or a combination thereof; residues, byproducts or waste from the processing of plant biomass, or feedstock derived from plant biomass, in a facility to yield food or non-food products, for example, but not limited to, residues remaining after obtaining sugar from plant biomass such as sugar cane bagasse, beet pulp, or residues remaining after removing sugar from Jerusalem artichoke, or a combination thereof; residues remaining after grain processing, such as corn fiber or corn stover; agricultural residues, for example, but not limited to, soybean stover, corn stover, rice straw, sugar cane straw, rice hulls, barley straw, corn cobs, wheat straw, canola straw, oat straw, oat hulls, corn fiber, or a combination thereof; forestry biomass for example, but not limited to, recycled wood pulp fiber, sawdust, hardwood, for example aspen wood, softwood, or a combination thereof; waste material derived from pulp and paper products such as newsprint, cardboard, or a combination thereof; and municipal waste, including sewage sludge.

Lignocellulosic feedstocks comprise cellulose in an amount greater than about 20%, more preferably greater than about 30%, more preferably greater than about 40% (w/w). For example, the lignocellulosic material may comprise from about 20% to about 50% (w/w) cellulose, or any amount therebetween. Furthermore, the lignocellulosic feedstock comprises lignin in an amount greater than about 10%, more typically in an amount greater than about 15% (w/w). Preferably, the lignocellulosic feedstock comprises about 25% to about 45% (w/w) cellulose, about 15% to about 35% (w/w) xylan and about 10% to about 25% (w/w) lignin. The lignocellulosic feedstock may also comprise sucrose, fructose and starch. Without being limiting, the amount of sucrose, fructose or starch present in lignocellulosic feedstocks is generally less than cellulose and xylan.

In one embodiment of the invention, the lignocellulosic feedstock is subjected to size reduction. Size reduction by mechanical action can be performed by any type of equipment designed for the purpose, for example, but not limited to, hammer mills, tub-grinders, roll presses, refiners, shredders and hydrapulpers.

Slurrying of the material may be carried out in any suitable batch or continuous mixing vessel, including a standpipe or pulper. Slurrying may be distinct from the liquid and chemical addition or may occur simultaneously therewith.

Slurrying can occur at any suitable consistency selected by those of ordinary skill in the art. However, in practice, the consistency of the slurry utilized will typically depend on the specific mixing means employed and the specific pumps or other conveyance means used. In one embodiment of the invention, the consistency of the feedstock slurry is between about 2% and about 40% (w/w) or more typically between about 1% and about 20%, between about 4% and about 20% (w/w), or between about 2% and about 16%.

Reference may be made to the "Handbook of Industrial Mixing" (Ed. Paul, Atiemo-Obeng, Kresta, 2004, Wiley-Interscience, Hoboken, N.J., incorporated herein by reference), which provides an introduction to the equipment and parameters of mixing performance and design. (See, for example, Chapters 10, 17 and 18 that particularly set forth methods for solid-liquid mixing).

The consistency of the aqueous slurry or the material exiting the press is expressed as undissolved solids concentration (UDS). The consistency may be determined by the procedure set out Example 1 of co-pending and co-owned WO 2012/027843, which is incorporated herein by reference. This procedure comprises obtaining a sample of material and weighing it. The pre-weighed material is passed through filter paper to isolate the solids. The solids are then washed with water and subsequently dried in a 105° C. oven overnight. The dried solids are weighed and the UDS is quantified by determining, as a percent (wt % or a fraction expressed as w/w), the number of grams of dry solids per gram of slurry.

Removal of Liquid by the Press

In accordance with the invention, the slurry is fed to a press to remove liquid therefrom. The slurry may be fed to the press by one or more pumps, such as those available from Sulzer Corp., or by other suitable feeding device. The slurry fed to the press may be at atmospheric pressure (15 psia; 2.1 kPa), or preferably at a higher pressure. In one embodiment of the invention, the pump or other feeding device increases the pressure of the feedstock slurry to e.g., about 100 psia to about 500 psia, or any value therebetween. The pressure may be measured with a pressure gauge located at the inlet on the press.

According to one embodiment of the invention, the press comprises an inlet, a deliquifying section, a plug formation section, a discharge section and an outlet, each of which are described in turn below.

The deliquifying section refers to a section of the press which operates by pressing liquid out of the slurry by the mechanical action of a conveyance member and in which undissolved solids are retained. As noted, the conveyance member is a device that advances material through the press. Preferably, the conveyance member is a rotating screw mounted axially in the press. The conveyance member may rotate within a shell containing openings through which the liquid can pass, but that retains most of the undissolved solids. The openings can be of a variety of shapes, including, without limitation, round, slotted or hexagonal. Liquid removed from the slurry at this stage is referred to herein as a "pressate stream". It should be appreciated that the liquid removed from the slurry in the deliquifying section may be an aqueous liquid or an organic liquid.

Preferably, after liquid removal from the slurry, the resultant partially deliquified slurry is compacted to form the plug of material by advancing it through the plug formation section, which refers to a section of the press in which the partially deliquified slurry is advanced by the press against a surface to compress or compact the slurry. It should be appreciated, however, that plug formation may start to occur in the deliquifying section. The plug formation section may comprise a cylindrical tube attached to the discharge end of the deliquifying section, as described in more detail hereinafter. The press preferably comprises anti-rotation elements in the plug formation section for reducing or eliminating rotation of the plug. Any suitable anti-rotation element known to those of skill in the art may be used to prevent or reduce such rotation.

The material is then advanced to a discharge section of the press, which refers to an enclosed space adjacent the outlet of the press. The pressure difference between the pressate stream and the discharge section of the press is preferably varied by varying the pressure of the pressate stream and holding the pressure of the discharge section constant. Without being limiting, the pressure of the pressate stream can be varied by opening a valve communicating with a chamber through which pressate is withdrawn from the press. The pressure of the pressate stream may be measured by a pressure sensor.

Preferably, the pressure difference between the pressate stream and the discharge section is greater than 2 psi (14 kPa), 5 psi (34 kPa), 8 psi (55 kPa) or 10 psi (69 kPa). The upper limit of the pressure differential may be 70 psi (482 kPa), 60 psi (414 kPa), 50 psi (345 kPa), 40 psi (276 kPa), 30 psi (207 kPa), more preferably 25 psi (172 kPa).

The pressure in the discharge section can be controlled through the addition of vapour, such as steam, or a compressed gas. The pressure in the discharge section may be controlled by steam or by compressed gas that is introduced through one or more inlets in the discharge section. Preferably, the pressure in the discharge section is controlled by steam.

Without being limiting, the pressate stream removed may contain a liquid comprising acid, alkali or any other chemical added to the slurry upstream of the press. Alternatively, chemicals are not added to the slurry upstream of the press, in which case the pressate stream will be composed primarily of water and other soluble components originating from the feedstock or other material making up the slurry. The liquid may also be non-aqueous, such as an organic solvent, including an oil-based solution.

Referring now to FIG. 1, there is shown an example of a screw press for removing liquid from a slurry in accordance with an embodiment of the invention. The screw press comprises a cylindrical shell 10 comprising a feedstock slurry inlet 20 and an outlet 30. A rotatable screw 50 is axially mounted within the shell to press liquid out of the slurry. Surrounding the screw 50, adjacent the inlet 20 of the screw press, is a concentric screen 40 that forms the deliquifying section of the screw press. The concentric screen 40, also referred to herein as a "basket", contains openings through which liquid can pass, while retaining solids.

The space between the shell 10 and the concentric screen 40 forms an enclosed pressate chamber 60. Means to control the pressate chamber 60 pressure are provided in the shell 10 and in this embodiment is a valve 75. The pressate stream is removed from the screw press through a pressate outlet 65.

The plug forming section of the press is adjacent to the deliquifying section. In this embodiment, a concentric shell 80 is attached to the discharge end of basket 40 and surrounds the screw 50. The plug forming section is an annular space 70 between the screw 50 and concentric shell 80. The flights of the screw 50 may partially enter the plug formation zone.

The discharge section of the screw press is an enclosed discharge chamber 85. The discharge section comprises a throat 90 defined by the concentric shell 80 and a discharge restrictor, which in this embodiment is a restricting cone 100 mounted on the screw 50. A plug breaker 110 is mounted on the screw adjacent to the restricting cone 100. Steam inlet means 120 is provided in the region of shell 10 adjacent to the discharge chamber 85 for introducing steam into the discharge section of the press.

In operation, a slurry is fed through inlet 20 of the screw press and enters the deliquifying section of the screw press. As the slurry is advanced forward by rotation of screw 50, liquid passes through openings in the basket 40, while solids are retained therein. Liquid that is removed from the slurry passes through pressate chamber 60 and is removed from the press through pressate outlet 65. In this embodiment, the pressure in the pressate chamber is 220 psia, which is controlled by valve 75. The pressure in the pressate chamber corresponds to the pressure of the pressate stream. Preferably, the pressure of the slurry at inlet 20 does not vary significantly from the pressate pressure. The pressate that is removed from the slurry may be recycled in the process if desired.

The partially deliquified slurry produced in the deliquifying section is advanced through the press to the plug formation section. In the plug formation section, the partially deliquified slurry enters the annular space 70 between the screw 50 and the concentric shell 80. In this embodiment, the shell 80 is shown as tubular, but it should be appreciated that other shapes can be employed, such as conical. As the partially deliquified slurry passes through the annular space 70, a tubular shaped plug is formed. The plug then advances through the throat 90 formed between concentric shell 80 and restricting cone 100. Restricting cone 100 partially obstructs the flow of the plug from the discharge end of the screw press. By obstructing the flow, counter pressure is built up against the plug, and the degree of compaction of the slurry is increased, which in turn leads to increased liquid removal from the slurry in the upstream deliquifying section of the press.

After passing through throat 90, the tubular plug enters the discharge section 85 of the screw press. As noted, the pressure in the pressate chamber is 220 psia, which is controlled by valve 75. The pressure within the discharge chamber is 240 psia due to the addition of steam through steam inlet means 120. Thus, the pressure differential between the pressate stream in chamber 60 and the discharge chamber is 20 psi. This pressure differential serves to remove additional water from the plug of material and controls the discharge consistency within a predetermined range. The pressure of the pressate stream may be measured by a pressure gauge located on the inner surface of the shell in the pressate chamber 60. Similarly, the pressure in the discharge section may be measured by a pressure gauge located on the inner surface of the shell 10 in the discharge chamber 85. The plug of material having reduced liquid content is broken into segments by plug breaker 110 and then exits the screw press through outlet 30.

By varying the pressure differential between the pressate stream and the discharge section of the press, the discharge consistency can be controlled without requiring complex mechanical devices for this purpose, such as variable discharge restrictors.

Preferably, the pressure differential is varied by varying the pressure of the pressate stream and holding the pressure of the discharge section constant. The pressate stream pressure may be controlled by a valve, as described, or by any other suitable means known to those of skill in the art. Alternatively, it is also possible to vary the pressure differential by varying the pressure of the discharge section and holding the pressure of the pressate stream constant.

Downstream Processing

Downstream of removing liquid in the press, the material may be subjected to various treatments to produce a biofuel or other chemical, including thermal, chemical, mechanical and/or biologic treatments. In the case of lignocellulosic feedstocks or other organic material, such treatments involve liberation of sugar from the feedstock, followed by conversion of the sugar into a fuel or chemical.

In one embodiment of the invention, there is provided a method for reducing steam or chemical use in a lignocellulosic conversion process.

Preferably, after liquid removal in the press, the feedstock is subjected to a pretreatment, which is conducted to disrupt the fiber structure of the lignocellulosic feedstock and increase its surface area. Deliquifying of the slurry in the press prior to pretreatment of the feedstock and/or other treatments can reduce the energy required for heating the feedstock and chemical usage in this stage of the process.

Prior to pretreating, the plug or plug segment may be heated and/or disintegrated in a fluffer, steam mixer or other suitable device.

In one embodiment, the pretreatment is performed to hydrolyze hemicellulose, which is a polysaccharide component of lignocellulosic feedstock. Another polysaccharide present in the feedstock is cellulose, which preferably remains largely intact during the pretreatment. After pretreatment, the cellulose may be hydrolyzed to glucose in a subsequent step that uses cellulase enzymes or a subsequent chemical treatment.

Pretreatment of the feedstock may be carried out with or without chemical addition. For example, pretreatment may involve the application of heat without chemical addition, known as hydrothermal pretreatment. Preferably, the pretreatment involves the addition of chemicals, such as acid, alkali or chemical solvents (e.g. Organosols pretreatment).

If acid pretreatment is conducted, it may be carried out at a maximum temperature of about 160° C. to about 280° C. The pressure during pretreatment may be between about 50 and about 700 psig or between about 75 and about 600 psig, or any pressure range therebetween.

Examples of suitable alkali pretreatment processes include ammonia fiber expansion (AFEX) or dilute ammonia pretreatment.

The pretreated or hydrolyzed feedstock may be discharged into a discharge device such as a screw discharger, a swept orifice discharger, a rotary discharger, a piston type discharger and the like. Two or more reactors, arranged in series or in parallel, may be used.

The hydrolyzed or pretreated feedstock exiting pretreatment may be depressurized and flash cooled, for example to between about 30° C. and about 100° C. In one embodiment of the invention, the pressure is reduced to about atmospheric. The cooling and depressurization may be carried out by one or more flash vessels.

If the hydrolyzed or pretreated feedstock exiting the reactor contains cellulose, it may be subjected to cellulose hydrolysis with cellulase enzymes. By the term "cellulase enzymes", "cellulase", or "enzymes", it is meant enzymes that catalyze the hydrolysis of cellulose to products such as glucose, cellobiose, and other cello-oligosaccharides. Cellulase is a generic term denoting a multienzyme mixture comprising exo-cellobiohydrolases (CBH), endoglucanases (EG) and glucosidases (G) that can be produced by a number of plants and microorganisms.

The sugars from hydrolysis may be fermented or subjected to one or more chemical reactions to produce a biofuel or chemical. The sugars that are subjected to the fermentation may include not only the glucose released during cellulose hydrolysis, but also sugars arising from a pretreatment, namely xylose, glucose, arabinose, mannose, galactose or a combination thereof. These sugars may be fermented together with the glucose produced by cellulose hydrolysis or they may be fed to a separate fermentation. In one embodiment of the invention, such sugars are converted to ethanol, along with the glucose from the cellulose hydrolysis, by a yeast or bacterium strain. Sugars can also be converted to sugar alcohols by chemical hydrogenation.

While the invention thus far has been described primarily in connection with biofuel or chemical production from lignocellulosic feedstocks or other organic material, the invention is not limited to such use. That is, the invention is also applicable in other industries in which removal of liquid is carried out in a press. Without being limiting, the invention may be employed in applications in which the discharge from the press is pressurized including feeding a pressurized disperger used in the treatment of waste paper or the feeding of a pressurized rejects refiner used in the production of mechanical pulp.

The invention claimed is:

1. A method of removing liquid from a lignocellulosic feedstock slurry using a press, the press comprising:
   an outer shell with an inlet end and an outlet end;
   at least one inner shell disposed within the outer shell; and
   a conveyance member mounted within the press such that the conveyance member is rotatable within the at least one inner shell around an axis, the conveyance member having a screw section configured to convey slurry from the inlet end towards the outlet end and into a pressurized discharge chamber,
   wherein the at least one inner shell comprises a concentric screen having a plurality of openings and a concentric shell adjoining the concentric screen, and wherein each of the concentric screen and the concentric shell surrounds a length of the conveyance member and is coaxial with the conveyance member, the method comprising:
   (a) feeding a pressurized slurry into an inlet of the press disposed at the inlet end, said slurry comprising lignocellulosic feedstock;
   (b) conveying the slurry fed into the inlet through a space between the conveyance member and the concentric screen, thereby passing at least a portion of liquid in the slurry through the openings while retaining at least some undissolved solids in the slurry;
   (c) removing the liquid passed through the openings from a pressate chamber disposed between the concentric screen and the outer shell;
   (d) using the conveyance member, pressing the retained undissolved solids into a decreasing space between the conveyance member and the concentric screen, thereby compressing the retained undissolved solids;
   (e) advancing the compressed undissolved solids to an annular space between the concentric shell and the conveyance member, thereby compacting the retained undissolved solids and forming an annular plug of material;
   (f) advancing the annular plug of material toward the pressurized discharge chamber;
   (g) introducing steam or a compressed gas into the pressurized discharge chamber via at least one inlet in the discharge chamber such that a pressure in the pressurized discharge chamber is higher than a pressure in the pressate chamber by at least 2 psi, thereby removing additional liquid from the annular plug of material;
   (h) discharging the annular plug material having reduced liquid content, or segments thereof, from the press via an outlet of the press disposed at the outlet end; and
   (i) controlling a consistency of the annular plug of material having reduced liquid content, or segments thereof, discharged in step (h), wherein the controlling step (i) comprises adjusting a pressure in the pressate chamber or adjusting a pressure in the pressurized discharge chamber, thereby varying a pressure differential between the pressate chamber and the pressurized discharge chamber, and wherein the controlling step (i) is conducted without using a variable discharge restrictor.

2. The method according to claim 1, wherein (i) comprises adjusting a pressure in the pressate chamber using a valve.

3. The method according to claim 2, wherein (g) comprises introducing steam into the pressurized discharge chamber such that a pressure in the pressurized discharge chamber is higher than a pressure in the pressate chamber by at least 5 psi.

4. The method according to claim 3, wherein the pressure differential between the pressate chamber and the pressurized discharge chamber is between 10 and 70 psi.

5. The method according to claim 4, wherein the conveyance member comprises a restricting cone configured to partially obstruct advancement of the annular plug of material.

6. The method according to claim 5, wherein the conveyance member comprises a plug breaker.

7. The method according to claim 6, wherein the concentric shell comprises anti-rotation elements configured to reduce or eliminate rotation of the annular plug of material with rotation of the conveyance member.

8. The method according to claim 7, wherein a consistency the annular plug of material having reduced liquid content, or segments thereof, is between 20 wt % and 35 wt % undissolved solids.

9. The method according to claim 8, wherein a pressure of the pressurized slurry is between 100 psi and 500 psi.

10. The method according to claim 1, wherein (g) comprises introducing steam into the pressurized discharge chamber such that a pressure in the pressurized discharge chamber is higher than a pressure in the pressate chamber by at least 5 psi.

11. The method according to claim 1, wherein the pressure differential between the pressate chamber and the pressurized discharge chamber is between 10 and 70 psi.

12. The method according to claim 1, wherein the conveyance member comprises a restricting cone configured to partially obstruct advancement of the annular plug of material.

13. The method according to claim 1, wherein the conveyance member comprises a plug breaker.

14. The method according to claim 1, wherein the concentric shell comprises anti-rotation elements configured to reduce or eliminate rotation of the annular plug of material with rotation of the conveyance member.

15. The method according to claim 1, wherein a consistency the annular plug of material having reduced liquid content, or segments thereof, is between 20 wt % and 35 wt % undissolved solids.

16. The method according to claim 15, wherein the conveyance member has an increasing cross-sectional area from the inlet end towards the outlet end.

17. The method according to claim 1, wherein a pressure of the pressurized slurry is between 100 psi and 500 psi.

18. The method according to claim 1, wherein the conveyance member has an increasing cross-sectional area from the inlet end towards the outlet end.

* * * * *